US009946807B2

(12) United States Patent
Abrams et al.

(10) Patent No.: US 9,946,807 B2
(45) Date of Patent: Apr. 17, 2018

(54) SYSTEM, METHOD AND COMPUTER PROGRAM PRODUCT FOR PROVIDING CONTENT BASED UPON A REPRESENTATION OF THE SAME

(75) Inventors: William M. Abrams, Searcy, AR (US); Ricky Lee Johnson, Scottsdale, AZ (US)

(73) Assignee: VITAL SOURCE TECHNOLOGIES, INC., Raleigh, NC (US)

( * ) Notice: Subject to any disclaimer, the term of this patent is extended or adjusted under 35 U.S.C. 154(b) by 0 days.

(21) Appl. No.: 13/448,022

(22) Filed: Apr. 16, 2012

(65) Prior Publication Data
US 2012/0203786 A1    Aug. 9, 2012

Related U.S. Application Data

(63) Continuation of application No. 10/860,980, filed on Jun. 4, 2004, now Pat. No. 8,160,998.

(51) Int. Cl.
*G06F 17/30* (2006.01)
(52) U.S. Cl.
CPC ................ *G06F 17/3092* (2013.01)
(58) Field of Classification Search
CPC .................................................. G06F 17/3092
See application file for complete search history.

(56) References Cited

U.S. PATENT DOCUMENTS

| 5,357,431 A | 10/1994 | Nakada et al. |
| 5,907,837 A | 5/1999 | Ferrel et al. |
| 5,930,799 A | 7/1999 | Tamano et al. |
| 6,069,999 A | 5/2000 | Gabor |
| 6,446,061 B1 | 9/2002 | Doerre et al. |

(Continued)

FOREIGN PATENT DOCUMENTS

| WO | WO 00/08909 | 2/2000 |
| WO | WO 02/17276 | 2/2002 |
| WO | WO 03/088092 | 10/2003 |

OTHER PUBLICATIONS

"About the W3C Document Object Model" by Microsoft Corporation, available online at http://msdn2.microsoft.com/en-us/library/ms533043.aspx.

(Continued)

*Primary Examiner* — Leslie Wong
(74) *Attorney, Agent, or Firm* — Patterson Intellectual Property Law, P.C.; Edward D. Lanquist, Jr.; Grant M. Ford

(57) ABSTRACT

A system for providing content includes a source and a client. The source is capable of generating a representation of the content, the content being hierarchically-structured and including at least one item having an associated type. The source is capable of generating a representation including an identity table and at least one type table, each item of content being included in the identity table, and included in a type table based upon the type of the item. Thereafter, the source can be capable of providing the representation of the content. The client is capable of receiving the representation of the content, and accessing at least a portion of the content based upon the representation. The client can also be capable of receiving a query for at least one item of content, searching the representation for the item(s), and accessing at least a portion of the content including the item(s).

37 Claims, 11 Drawing Sheets

(56) References Cited

U.S. PATENT DOCUMENTS

| | | | |
|---|---|---|---|
| 6,635,089 B1 | 10/2003 | Burkett et al. | |
| 6,636,802 B1 | 10/2003 | Nakano et al. | |
| 6,662,342 B1* | 12/2003 | Marcy | 715/227 |
| 6,959,416 B2* | 10/2005 | Manning et al. | 715/227 |
| 7,065,562 B2 | 6/2006 | Courtney | |
| 7,120,863 B1* | 10/2006 | Wang | G06F 17/2241 707/999.007 |
| 7,139,973 B1 | 11/2006 | Kirkwood et al. | |
| 7,174,327 B2* | 2/2007 | Chau et al. | |
| 7,233,940 B2 | 6/2007 | Bamberger et al. | |
| 7,366,708 B2 | 4/2008 | Jalali et al. | |
| 7,634,789 B2 | 12/2009 | Gerba et al. | |
| 7,769,648 B1 | 8/2010 | Nolan | |
| 7,779,027 B2* | 8/2010 | James et al. | 707/769 |
| 7,779,442 B1 | 8/2010 | Fukuzawa et al. | |
| 8,140,577 B2* | 3/2012 | Hughes | G06F 17/2247 707/790 |
| 8,160,998 B2* | 4/2012 | Abrams et al. | 707/602 |
| 2002/0078057 A1 | 6/2002 | Wang et al. | |
| 2002/0120596 A1* | 8/2002 | Gershoff | G06F 17/30017 |
| 2002/0147644 A1 | 10/2002 | Subramanian et al. | |
| 2002/0161796 A1 | 10/2002 | Sylthe | |
| 2002/0169788 A1 | 11/2002 | Lee et al. | |
| 2003/0055832 A1 | 3/2003 | Roccaforte | |
| 2003/0061060 A1 | 3/2003 | Tenorio | |
| 2003/0182268 A1 | 9/2003 | Lal | |
| 2003/0225853 A1 | 12/2003 | Wang et al. | |
| 2004/0034615 A1 | 2/2004 | Thomson et al. | |
| 2005/0086188 A1 | 4/2005 | Hillis et al. | |
| 2005/0187954 A1* | 8/2005 | Raman et al. | 707/100 |

OTHER PUBLICATIONS

"Indexing with Microsoft Inde Server" by Krishna Nareddy (Jan. 30, 1998).

"Introduction to Microsoft Index Server" by Krishna Nareddy, available online at http://msdn.microsoft.com/en-us/library/dd582938(office.11,printer).aspx (Oct. 15, 1997).

Anatomy of a Search Solution by Krishna Nareddy, available online at http://msdn.microsoft.com/en-us/library/dd582940(printer).aspx (Jul. 29, 1997).

B. Rosenblatt, B. Trippe, S. Mooney, Digital Rights Management; pp. 79-88, 95-96; Chapter 5, DRM Building Blocks: Protecting and Tracking Content; M&T Books; XP002341140; New York (2002).

Bourret, R.; Bornhovd, C.; Buchmann, A., "A generic load/extract utility for data transfer between XML documents and relational databases," Advanced Issues of E-Commerce and Web-Based Information Systems, WECWIS 2000. Second International Workshop on, vol., No., pp. 134-143 (2000).

C Kerer and E. Kirda, "Layout, Content and Logic Separation in Web Engineering", 3rd Workshop on Web Engineering, World Wide Web Conference (WWW9), Amsterdam, The Netherlands. http://citeseer.ist.psu.edu/kerer00layout.html (2000).

* cited by examiner

SYSTEM, METHOD AND COMPUTER PROGRAM PRODUCT FOR PROVIDING CONTENT BASED UPON A REPRESENTATION OF THE SAME

CROSS REFERENCE TO RELATED APPLICATION

This application is a continuation of application Ser. No. 10/860,980, filed Jun. 4, 2004 which application is incorporated herein by reference in its entirety.

FIELD OF THE INVENTION

The present invention generally relates to systems and methods for providing content and, more particularly, relates to systems, methods and computer program products for providing a representation of hierarchically-structured content in a manner that improves efficiency in retrieving or otherwise accessing content based upon the representation.

BACKGROUND OF THE INVENTION

In today's educational climate, an increasing number of persons seek knowledge and further education regarding a truly diverse and wide variety of subjects. As can be appreciated, education and training takes a wide variety of forms. Education starts at a very young age and extends through high school. Thereafter, persons may attend any of a variety of universities, colleges or technical centers. However, education and training is not limited to these formal environments. Illustratively, many companies, agencies and other entities implement training programs to train people with the skills those people need for their respective jobs. Additionally, after receiving a college education, many persons, in an increasingly greater rate, attend some type of graduate school. Graduate schools may include medical school, law school and business school, as well as a wide variety of other advanced curriculums. Even after such higher educations, for example, persons still attend conferences, seminars and other organized meetings to exchange information and ideas.

Accordingly, education and training are present in our lives from a very young age and might never end for some persons. As described above, this education takes a wide variety of forms. However, one common thread running through this education is the necessity to convey information from persons and materials that possess the knowledge, to persons wanting the knowledge. The persons providing the knowledge will hereinafter be referred to as "teachers," with those persons receiving the knowledge referred to as "students."

The training environment of a medical student provides insight into the presently used teaching methods. Typically, a medical student starts his or her education with the hope of being enriched by the knowledge he or she seeks. Typically, a medical student may walk into a classroom and, from day one, the lights go out and the slides start flashing on the screen. The rate at which the slides are shown may average as much as 180 slides per hour. Nevertheless, the slides pass by in front of the medical student and she is expected to digest this information.

The information used in teaching may come from numerous sources. For example, the slides shown to the medical students may be the result of years of collecting by the professor. Further, the slides may be one of a kind that the professor obtained from the professor's mentor, who used to be chairman of their department before he retired.

The students correctly perceive those slides as being of tremendous value. However, the students see the slides one time, and only one time, and then the slides are gone forever. After class, then, the students attempt to conjure up the slides either working alone or in groups. The students often unsuccessfully attempt to draw the slides when they are displayed in class. But before the essence of the slide is really captured, the next slide is being displayed. Then, after class the students might approach the professor and humbly request a copy of the slides. However, the slides often represent the career of the professor. As a result, the professor is hesitant to assist in a reproduction of his documents in any form.

The above scenario illustrates one of a variety of situations that prevent the exchange of information and knowledge from a teacher to a student. Accordingly, the scenario results in the students recreating the knowledge to which they were exposed. This re-creation might be in the form of notes or crude reproductions of the slides, or whatever other information was presented in class that day. Accordingly, there is a need to provide a method to exchange knowledge from a teacher to a student that is both beneficial and acceptable to all parties.

Alternatively, a situation may be present when the teacher does indeed prepare and provide materials to the students. However, even in this situation there are common problems. For example, a teacher may copy a favorite diagram from a resource book and paste that diagram into their own created materials. The teacher may then surround this copied diagram with the teacher's own text. This, for one, results in potential copyright infringement violations. Also, with the advent of desktop publishing capabilities, the accumulation of these materials is becoming progressively easier. The student accurately perceives this material as coming straight from the professor and, as a result, considers the material of great value. In addition, the university, for example, may require the student to purchase the professor's material. Alternatively, the university will recommend that the student buy a series of materials from a particular publisher.

Accordingly, a situation has developed in the academic world, and in other learning environments, in which administrative persons, faculty members and students are discouraged and concerned with regard to the decreasing quality of their study materials. People are discouraged both from the perspective of a teacher, providing the materials, and from the perspective of a student, receiving the materials. For students, the situation is particularly discouraging in that their command of the material, in testing situations as well as other situations, will dictate the success of their careers.

To address the aforementioned issues, systems have been developed to effectively collect information from a wide variety of sources and provide one or more items of material from this collection to students in an efficient manner. In accordance with one such system, an entire educational curriculum for an organization can be made available to a user in a readily accessible collection. That is, a collection can be characterized as global to a particular organization, such as a college or corporation, including all curriculum materials that the particular organization utilizes. The system can then provide for navigation of information in the collection to thereby permit a user to interact with one or more items of material in the collection as if those item(s) were single textbook(s), journal(s), video(s) or treatise(s), for example.

In such systems, curriculum material, including text and graphics, can be obtained from various sources, such as various professors and/or publishers, and thereafter digitized. In this regard, the text can be re-keyed or programmatically converted, while the graphics are scanned. Then, both the text and the graphics can be recombined utilizing a "mark-up" language, such as the Extensible Markup Language (XML). In such instances, the curriculum materials are structured in a hierarchical manner. That is, a book includes chapters, the chapters include sections, the sections include subsections, and so forth. Within one or more chapters, sections, subsections or the like, then, the curriculum may include graphics, such as diagrams and/or flowcharts.

As will be appreciated, such digitized curriculum materials can have very large files requiring a large amount of memory to store and render for display to a user. For example, the book PRINCIPLES OF INTERNAL MEDICINE can require 40 MB to fully digitize and mark up in accordance with XML. In such instances, it can require a computer system, such as that operated by a user, an undesirable amount of time to render the digitized curriculum materials for display to the user, and in some cases, overload the computer system to the point where the computer system fails to properly display the materials.

Thus, it may be desirable to configure the materials such that only a portion of the materials are rendered for display at any given time. Even structuring the materials in this manner, however, may require a computer system an undesirable amount of time to render the materials for display. In this regard, to render only a portion of curriculum materials structured in a hierarchical manner conventionally requires the computer system to access the materials from memory in a hierarchical manner from top down, and traverse the accessed materials until the particular portion of the curriculum materials is located. Such a process is typically inefficient, however, as it requires the computer system to access portions of the curriculum materials (i.e., those portions traversed before locating the desired portion) not subsequently utilized by the computer system in rendering the desired portion for display.

SUMMARY OF THE INVENTION

In light of the foregoing background, embodiments of the present invention provide an improved system, method and computer program product for providing content. The system, method and computer program product of embodiments of the present invention are capable of generating a representation of hierarchically-structured content that includes at least one item, and more typically a plurality of items. The representation of the content can thereafter be provided, such as to a client, to access at least a portion of the content based upon the representation. Advantageously, by accessing the content based upon the representation, the content or a select portion of the content can be rendered without requiring the client to access the content in a hierarchical manner from top down, and traverse the accessed materials until the select portion of the content is located, as is required in conventional systems. As such, the representation of the content facilitates the client accessing and thereafter rendering content by only requiring the client to access those portions of the content subsequently utilized by the client in rendering the select portion for display.

According to one aspect of the present invention, a system is presented for providing content, the system including a source and a client. The source is capable of generating a representation of the content, the content being hierarchically-structured and including at least one item having an associated type. In this regard, the source is capable of generating a representation including an identity table and at least one type table, each item of content being included in the identity table, and included in a type table based upon the type of the item. After generating the representation, the source can be capable of providing the representation of the content, such as to the client. The client, then, is capable of receiving the representation of the content, and accessing at least a portion of the content based upon the representation.

The source can be capable of generating the representation of the content by also generating a tree-based representation of the content including at least one node representing the at least one item, and traversing the tree-based representation of the content to thereby process the at least one item in the hierarchical-structure of the content. In such instances, the source can be capable of generating the identity table and at least one type table during traversal of the tree-based representation of the content. More particularly, the source can be capable of traversing the tree-based representation of the content and generating an identity table and at least one type table by first identifying an item of content, adding the item to the identity table, and then adding the item to a type table based upon the type of the item. The source can then be capable of identifying an item, and adding the item to the identity table and a type table for at least one of the item(s) of content.

In one typical instance, the item(s) of content each have an associated type of either an element, attribute or character data. In this regard, the source can be capable of generating an element table when at least one item has an associated element type, an attribute table when at least one item has an associated attribute type, and a character data table when at least one item has an associated character data type.

Also in such instances, each character data item can include at least one term. As such, the source can be capable of generating a representation of the content further including a character data index, the character data index including at least one term of at least one character data item. More particularly, the source can be capable of generating the character data index by traversing a character data item, adding at least one term of the character data item to the character data index. Then, the source can identify, for the at least one term, a parent item of each character data item including the respective term. Similar to before, the source can be capable of traversing a character data item, adding at least one term and identifying the parent item of each respective character data item for at least one of the character data item(s) from the character data table.

More particularly with respect to the client, the client can be capable of accessing at least a portion of the content by recreating a tree-based representation of at least a portion of the content based upon the identity table and at least one type table. Thereafter, the client can generate at least a portion of the content from the recreated tree-based representation to thereby access the generated potion of the content. More particularly, the client can be capable of recreating the tree-based representation generating at least one node of the tree-based representation, each node representing an item of the respective portion of the content. For example, the client can be capable of generating a node of the tree-based representation by selecting, from the identity table, an item within the respective portion of the content, generating a node of the tree-based representation for the selected item, and traversing at least one descendant item of the selected item when the selected item has at least one descendant item. In this regard, traversal of the descendant item(s) can include generating a node representing each of at least one descendant item, and associating the node with a respective parent item.

The client can be further capable of searching the representation of the content for one or more items of content. In such instances, the client can be capable of receiving a query identifying at least one item of the content. The client can then search the representation of the content for the item(s) identified by the query, and wherein the client is capable of accessing at least a portion of the content based upon the search, the accessed portion of the content including the item(s) identified by the query. The client can then be capable of accessing at least a portion of the content by recreating a tree-based representation of at least a portion of the content including the item(s) of content identified by the query; and generating at least a portion of the content from the recreated tree-based representation.

More particularly, when the item(s) of content each have an associated type of an element, attribute or character data, the client can be capable of receiving a query including either a name of one or more element items, or a name of one or more attribute item. In such instances, the identity table of the representation of the content can include, for any element and attribute item(s), a name associated with the respective item. Thus, the client can be capable of searching the representation of the content by searching the identity table for a name matching a name included in the query. In contrast, the client can be capable of receiving a query including at least one term included in at least one character data item. In these instances, the representation of the content further can include a character data index including at least one term of at least one character data item. As such, the client can be capable of searching the representation of the content by searching the character data index for at least one term matching at least one term included in the query.

According to other aspects of the present invention, a method and computer program product are presented for providing content. In addition, a source is presented for providing content, and a client is presented for accessing content. By generating the representation of the content, and accessing portion(s) of the content based upon the representation, embodiments of the present invention permit a client to render the portion(s) of the content without accessing the content in a hierarchical manner from top down, and traversing the accessed materials until the select portion of the content is located, as is required in conventional systems. As indicated above and explained below, the representation of the content facilitates the client accessing and thereafter rendering content by only requiring the client to access those portions of the content subsequently utilized by the client in rendering the select portion for display. Therefore, the system, method and computer program product of embodiments of the present invention solve the problems identified by prior techniques and provide additional advantages.

BRIEF DESCRIPTION OF THE DRAWINGS

Figure 1:
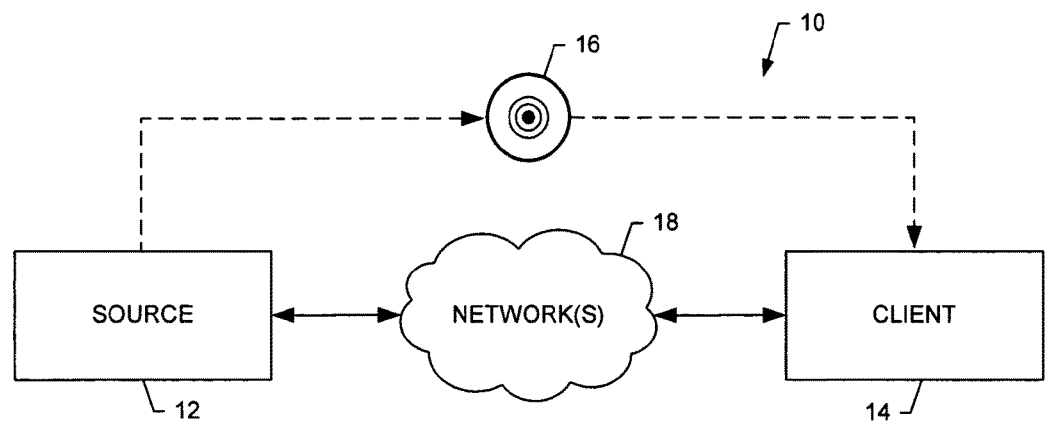
Figure 2:
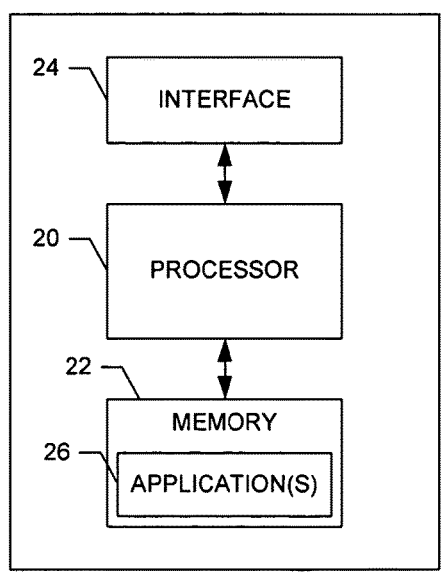
Figure 3:
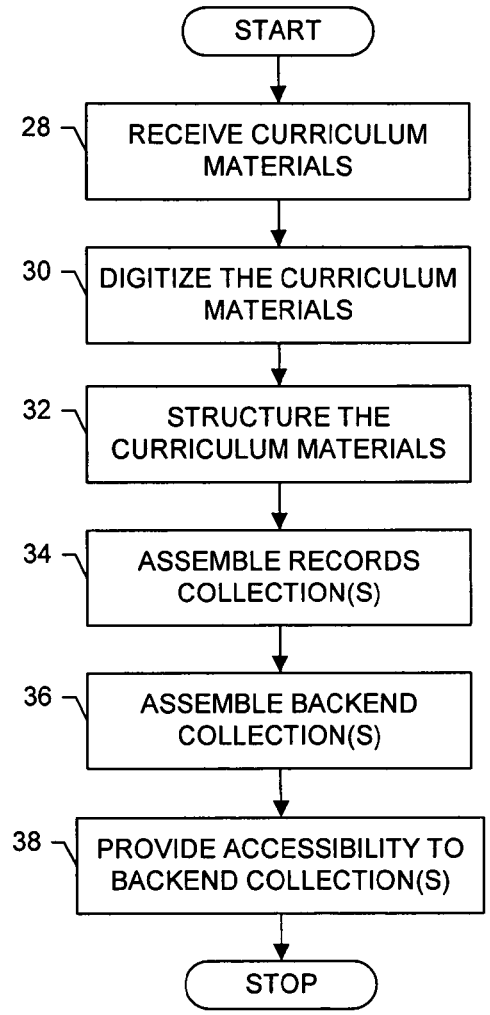
Figure 4A:
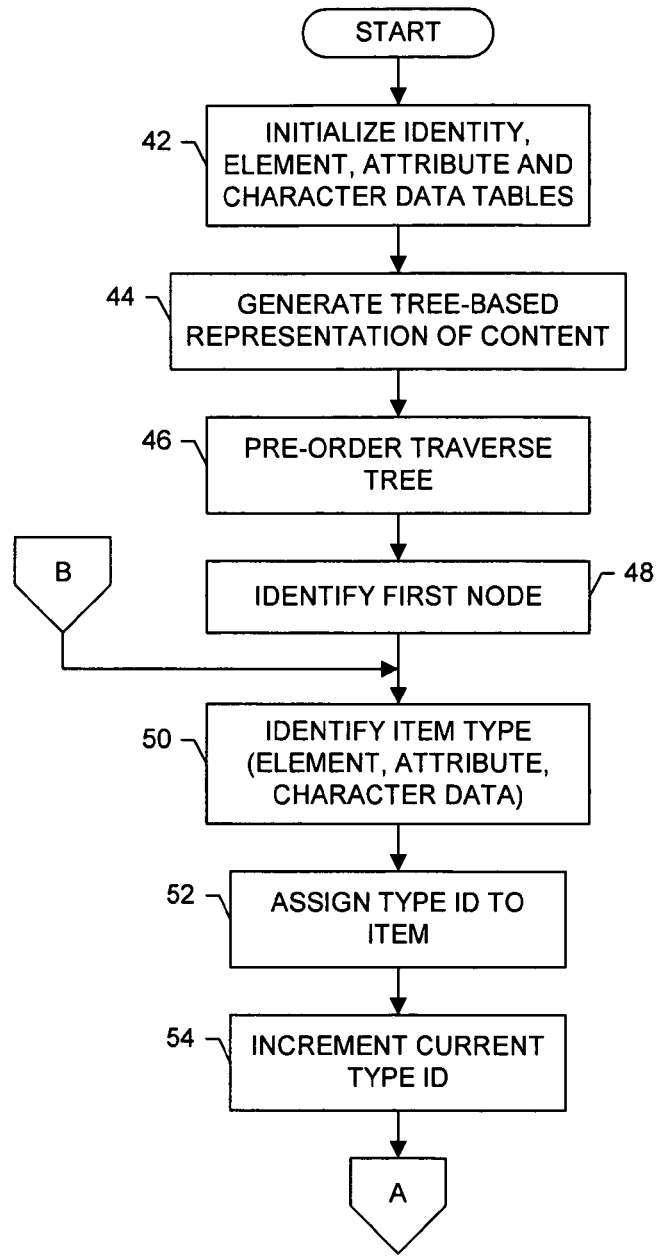
Figure 4B:
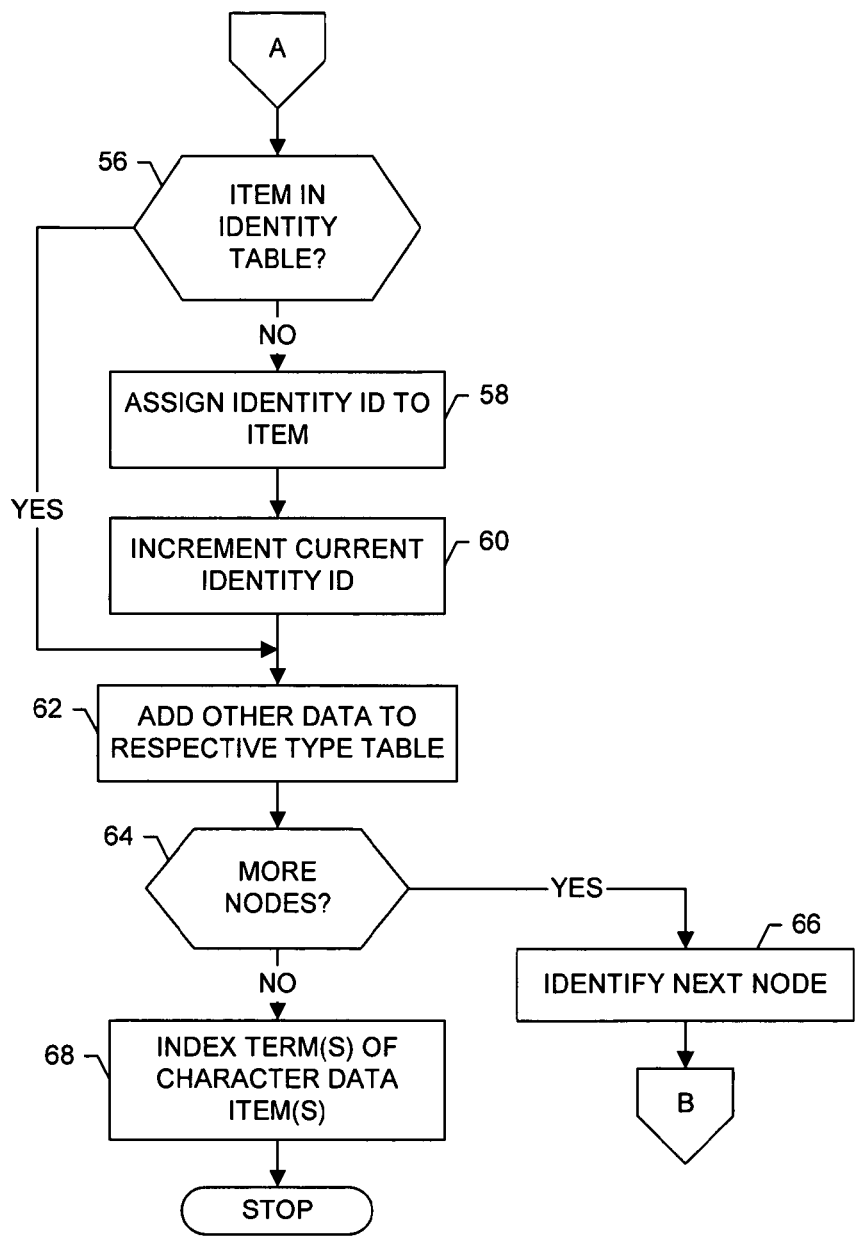
Figure 5:
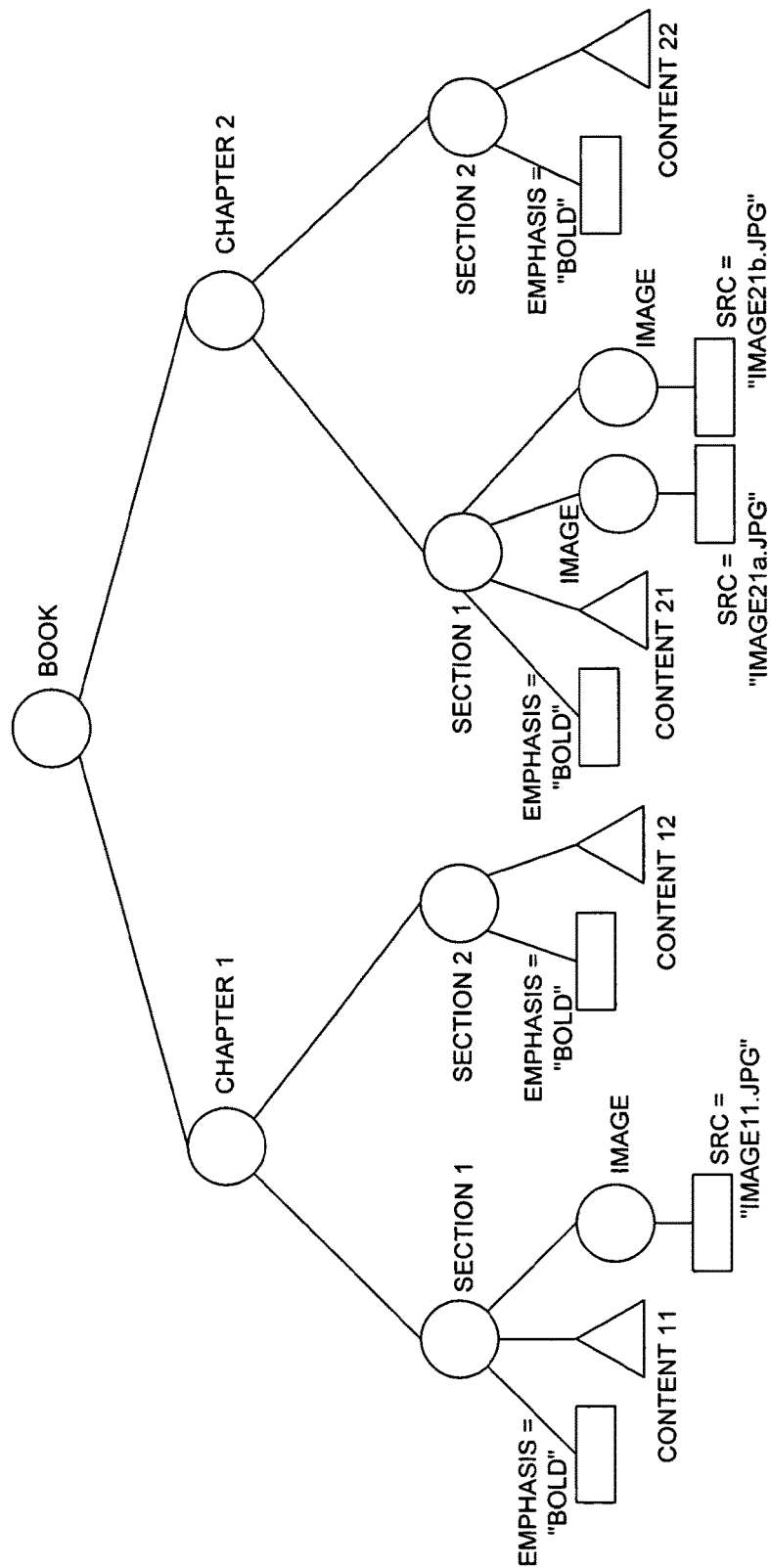
Figure 6:
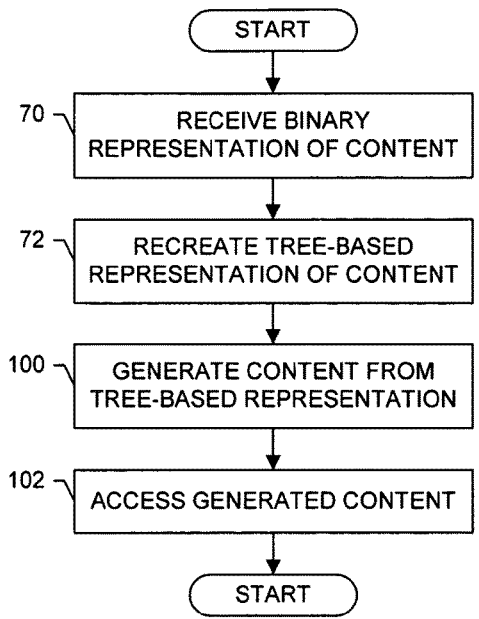
Figure 7A:
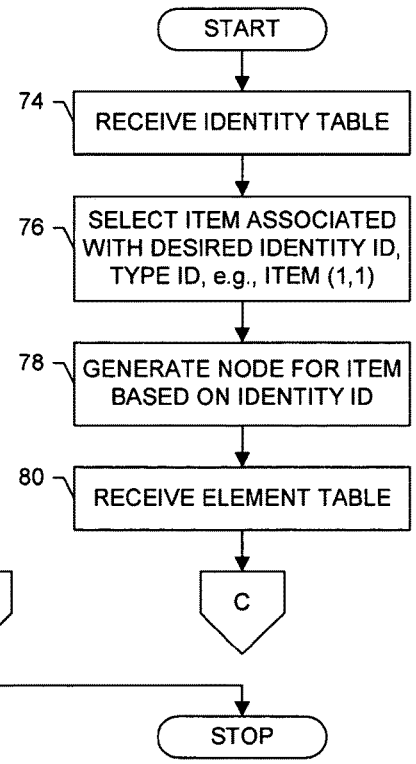
Figures 7B, 7C:
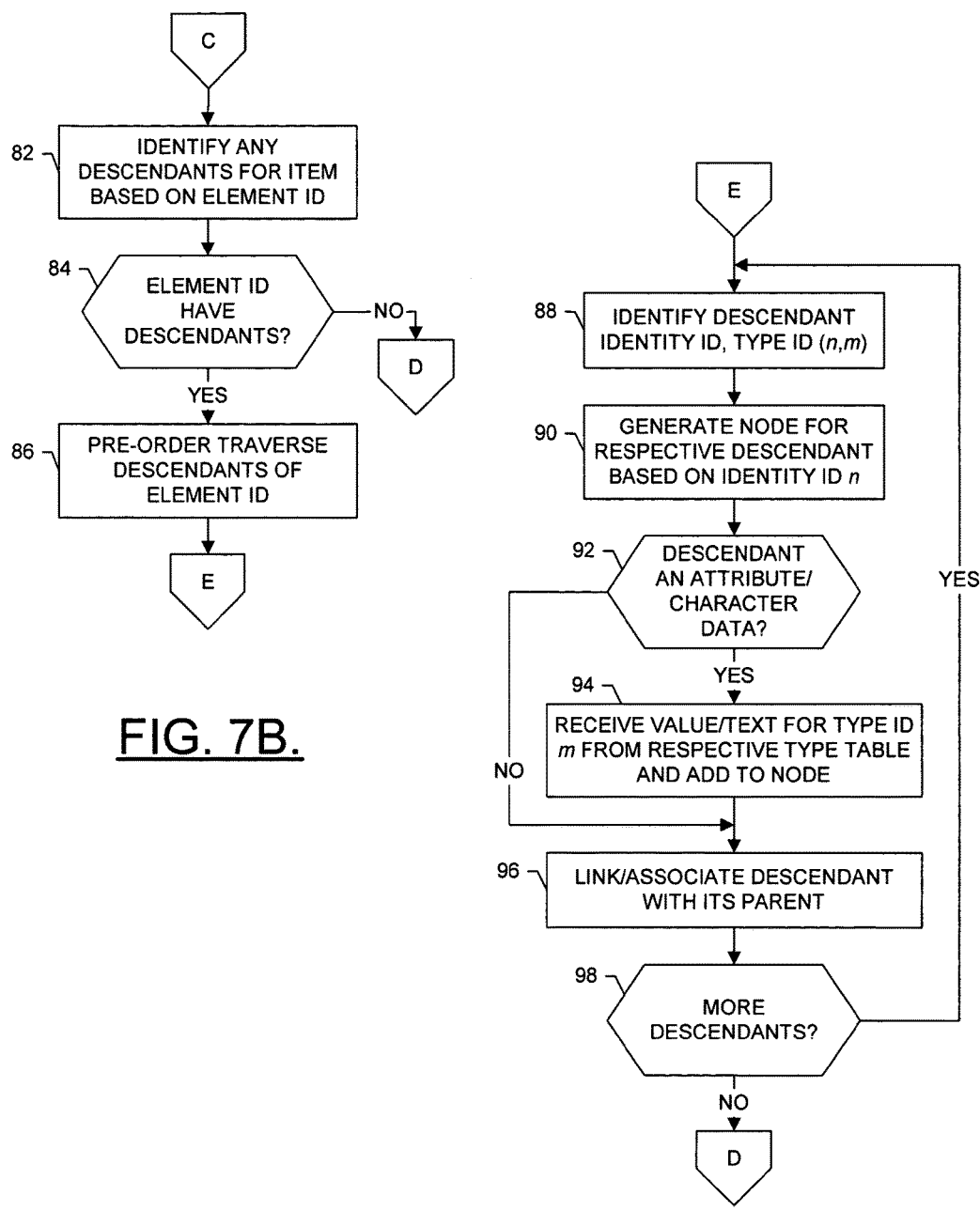
Figure 8:
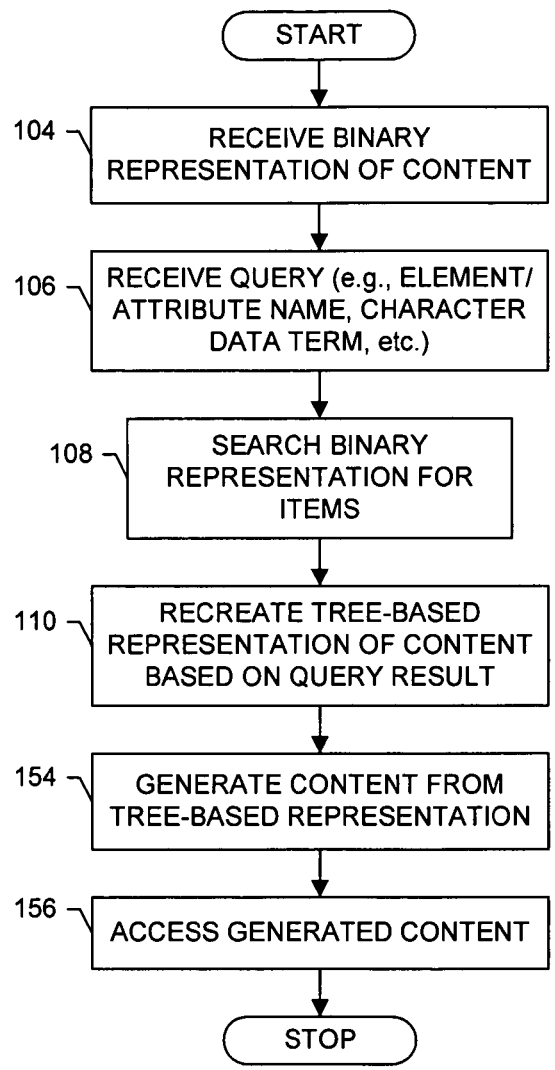

Having thus described the invention in general terms, reference will now be made to the accompanying drawings, which are not necessarily drawn to scale, and wherein:

FIG. 1 is a block diagram of a system for representing hierarchically-structured content, and accessing content based on the representation, in accordance with an embodiment of the present invention;

FIG. 2 is a block diagram of an entity capable of operating as a source and/or client, in accordance with an embodiment of the present invention;

FIG. 3 is a flowchart illustrating various steps in a method of providing content, in accordance with an embodiment of the present invention;

FIGS. 4A and 4B are flowcharts illustrating various steps in a method of representing hierarchically-structured content, in accordance with one embodiment of the present invention;

FIG. 5 is a schematic illustration of a tree-based representation of content, in accordance with an embodiment of the present invention;

FIG. 6 is a flowchart illustrating various steps in a method of accessing content, in accordance with one embodiment of the present invention;

FIGS. 7A, 7B and 7C are flowcharts illustrating various steps in a method of recreating a tree-based representation of content from a binary representation of the same, in accordance with one embodiment of the present invention;

FIG. 8 is a flowchart illustrating various steps in a method of searching content, in accordance with one embodiment of the present invention; and FIGS. 9A, 9B, 9C and 9D are flowcharts illustrating various steps in a method of searching a representation of content for one or more items of the content, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 for representing hierarchically-structured content, and accessing content based on the representation, includes one or more sources 12 of content and clients 14 (one of each being shown). Each source 12 of content is capable of directly and/or indirectly communicating with one or more clients 14. Similarly, each client 14 may be capable of directly and/or indirectly communicating with one or more sources 12. For example, one or more sources 12 can be capable of providing content to one or more clients 14, the content being stored on a removable electronic storage medium 16 (e.g., DVD). Additionally or alternatively, for example, one or more sources 12 can be capable of providing content to one or more clients 14 across one or more networks 18. The network(s) can comprise any of a number of different combinations of one or more different types of networks. For example, the network(s) can include one or more data networks, such as a local area network (LAN), a metropolitan area network (MAN), and/or a wide area network (WAN) (e.g., Internet), and include one or more wireline and/or wireless voice networks, including a wireline network such as a public-switched telephone network (PSTN), and/or wireless networks such as IS-136 (TDMA), GSM, and/or IS-95 (CDMA). For purposes of illustration, however, as described below, the network comprises the Internet (i.e., WAN) unless otherwise noted.

The source 12 and client 14 can comprise any one or more of a number of different entities, devices or the like capable of operating in accordance with embodiments of the present invention. In this regard, one or more of the source 12 and client 14 can comprise, include or be embodied in one or more processing elements, such as one or more of a laptop computer, desktop computer, server computer or the like. Additionally or alternatively, one or more of the source 12 and client 14 can comprise, include or be embodied in one or more portable electronic devices, such as one or more of a mobile telephone, portable digital assistant (PDA), pager or the like. For example, the source 12 and client 14 can each comprise a processing element capable of communicating with one another across the Internet (e.g., network 18). It should be understood, however, that one or more of the source 12 and client 14 can comprise or otherwise be associated with a user carrying out one or more of the functions of the respective entity. Thus, as explained below, the term "source" can refer to a source and/or source user, and vice versa. Similarly, the term "client" can refer to a client and/or client user, or vice versa.

Referring now to FIG. 2, a block diagram of an entity capable of operating as a source 12 and/or client 14 is shown in accordance with one embodiment of the present invention. Although shown as separate entities, in some embodiments, one or more entities may support both a source 12 and a client 14, logically separated but co-located within the entit(ies). It should also be appreciated that one or more entities may be capable of performing one or more functions of one or more other entities. In this regard, a source 12 may be capable of performing one or more functions of a client 14. Additionally, or alternatively, a client 14 may be capable of performing one or more functions of a source 12.

As shown, the entity capable of operating as a source 12 and/or client 14 can generally include a processor 20 connected to a memory 22. The processor 20 can also be connected to at least one interface 24 or other means for transmitting and/or receiving data, content or the like. In this regard, the interface(s) can include a user interface that can include a display and a user input interface. The user input interface, in turn, can comprise any of a number of devices allowing the entity to receive data from a user, such as an electronic scanner, keyboard, mouse and/or any of a number of other devices components or the like capable of receiving data, content or the like.

The memory 22 can comprise volatile and/or non-volatile memory, and typically stores content, data or the like. In this regard, the memory 22 typically stores software applications 26, instructions or the like for the processor 20 to perform steps associated with operation of the entity in accordance with embodiments of the present invention. For example, as explained below, when the entity comprises a source 12, the memory 22 can store software applications associated with the source 12, such as a content manager for managing hierarchically-structured content. Also, for example, when the entity comprises a client 14, the memory 22 can store software applications associated with the client 14, such as an access application for accessing content provided by the source 12.

In accordance with embodiments of the present invention, the source 12 is generally capable of providing one or more pieces of content to one or more clients 14. For example, the source 12 can be capable of providing one or more pieces of educational curriculum for an organization in a readily accessible collection. In such instances, the collection can be characterized as global to a particular organization, such as a college or corporation, including a plurality of curriculum materials that the particular organization utilizes. It should be understood, however, that curriculum materials are only one of a number of different types of content, information, data or the like that the source 12 is capable of providing to the client(s) 14. Thus, as used herein, the terms "curriculum materials," "content," "information," and "data" can be used interchangeably to refer to that provided by the source 12 to the client(s) 14.

Briefly, and as explained below, before providing content to the client(s) 14, the source 12 is capable of managing the content in a manner that facilitates a client 14 rendering the content in a more expeditious and efficient manner as compared to conventional techniques. More particularly, a content manager (i.e., software application 26) operating on the source 12 is capable of structuring and generating a representation of the hierarchically-structured content, the representation hereinafter being referred to as a "binary representation" of the content. A client 14 can receive the binary representation of the content, and thereafter access all or a select portion of the content based upon the binary representation. More particularly, an access application (i.e., software application 25) operating on the client 14 can be capable of receiving the binary representation of the content, and a selection of a portion of the content if so desired, and recreating the content or portion of the content based upon the binary representation. Advantageously, by accessing the content based upon the binary representation, the client 14 can thereafter be capable of rendering the content or select portion of the content without requiring the access application to access the content from the memory 22 in a hierarchical manner from top down, and traverse the accessed materials until the select portion of the content is located, as is required in conventional systems. As such, the binary representation of the content facilitates the access application accessing and thereafter rendering content by only requiring the access application to access those portions of the content subsequently utilized by the client 14 in rendering the select portion for display.

As described herein, the content manager and access application each comprise software (i.e., software application 25) are each capable of operating on the source 12 and client 14, respectively. It should be understood, however, that the content manager and/or access application can alternatively be embodied in firmware, hardware or the like. Further, although the content manager and access application are shown and described herein as operating on the source 12 and client 14, respectively, it should be understood that the content manager and/or access application can be capable of operating on an entity (e.g., personal computer, laptop computer, server computer, etc.) distributed from, and in communication with the source 12 and/or client 14, such as across the Internet (i.e., network 18).

Reference is now made to FIG. 3, which illustrates a flowchart of a method of providing content, in accordance with an embodiment of the present invention. The method includes the source 12 providing one or more pieces of content to one or more clients 14, such as one or more pieces of curriculum materials. In this regard, the source 12 can directly provide the piece(s) of content to one or more clients 14. Alternatively, the source 12 can indirectly provide the piece(s) of content to one or more clients 14, such as via any one or more of a number of distributors or other providers of such content from the source 12. Irrespective of whether the source 12 directly or indirectly provides the content to the client(s) 14, the source 12 can provide the content in any of a number of different manners.

In one advantageous embodiment providing curriculum materials, for example, the source 12 is capable of receiving curriculum materials via a user input interface (e.g., interface 24) of the source 12, as shown in block 28. After receiving the curriculum materials, the source 12 can store the received materials in the memory 22 of the source 12. Also after receiving the curriculum materials, as shown in block 30, the source 12 can format and digitize the curriculum materials. Thereafter, the source 12 can facilitate a source user in structuring the curriculum materials, or otherwise structure the curriculum materials, as shown in block 32. For example, the source 12 can structure or otherwise mark-up the curriculum materials in accordance with the Extensible Markup Language (XML). It should be understood, however, that the source 12 can structure the curriculum materials in accordance with any of a number of other markup languages, formats or the like.

As will be appreciated by those skilled in the art, similar to Hypertext Markup Language (HTML), XML uses tags to describe elements within a page of text. However, whereas HTML utilizes only predefined tags, XML permits the developer of the page to define the tags. As such, XML tags can be utilized to identify virtually any data item. Accordingly, XML permits a marked-up document to function in a manner similar to a database record. In this regard, the text in an XML document can be divided into two groups: character data and markup. Markup comprises elements and attributes, which can be defined by the tags and syntax of XML components, whereas character data makes up the information stored in the content.

More particularly, elements are marked-up items that include beginning tag and ending tags that bound some type of data. The data within an element can comprise other elements or character data. An attribute, on the other hand, can associate a value with an element such as to store data that may not contribute much to the structure of content, but increase the informational value of an element. For example, a digitized textbook describing the human anatomy may include an element for an image of the human heart. In such an instance, the human heart element can include an attribute referring to the image source (e.g., src) with a value identifying the image ("image.gif"). As will be appreciated, elements and attributes can include names or other identifiers that identify the kind of marked-up item. In this regard, the name of an element can comprise that included within the beginning and ending tags of the respective element, with the name of an attribute including that having an associated value.

Generally, XML can be characterized as a series of envelopes (i.e., XML tags) containing letters, where the envelopes identify the letter within the respective envelopes. On the other hand, the letter is equivalent to the text in a marked-up document, where the text can be identified by the XML tags associated with the respective text. And as will be appreciated, in conjunction with use of XML, a Document Type Definition (DTD) provides the rules under which a document is marked-up using XML. In this regard, the DTD specifies the structure of the XML marked-up document, including the manner in which the content of the document is nested.

The curriculum content can be marked-up in accordance with a human decision-making technique. In such instances, a source user can interact with the source 12 to mark up the curriculum content. Alternatively, the source 12 can function to mark up the curriculum content in accordance with an automated technique, typically without user interaction. For example, the source 12 can mark up the curriculum content based on the detection of one or more key words within the curriculum content. Subsequent to marking up the curriculum content, then, the source 12 can store the marked-up curriculum materials in the memory 22 of the source 12.

More particularly, the source 12 can operate by first downloading the curriculum material from the memory 22 of the source 12. Then, for each item of curriculum material, the source 12 can determine whether the item is a graphic or text. If the item is a graphic, the source 12 can then digitize the graphic (if necessary), and thereafter tag the graphic to designate where the graphic is positioned in the marked-up text. On the other hand, if the item is text, the source 12 can structure the text with a suitable markup language, as described above. Then, after the graphics are tagged and the text is marked-up, the source 12 can, if so desired, validate the curriculum material, such as by validating that the source 12 properly digitized and structured the curriculum materials.

As explained below, as or after the source 12 marks up the curriculum materials, the source 12, or more particularly the content manager (i.e., software application 26), can generate a binary representation of the materials. Briefly, the content manager can generate a number of tables including items of the curriculum materials, where each item is represented in a global, identity ID (identifier) table as well as an item type-specific, type table. For example, in accordance with XML, items of content can be characterized by the type of item, such as an element, attribute or character data. In this regard, each item can include an associated identity ID that identifies that item within the identity table, and a type ID that identifies that item within a respective type table, whether an element table, attribute table or character data table. Within each table, then, the IDs can include one or more piece of information relating to respective items of the content.

After the source 12 structures the curriculum materials and generates the binary representation of the curriculum materials, the source 12 can assemble one or more "records collections," each identifying one or more pieces of curriculum materials of particular interest to one or more client users, as shown in block 34. In one typical scenario, curriculum materials of interest to a plurality of different client users are stored in the memory 22 of the source 12. In such instances, the curriculum materials stored in the memory 22 of the source 12 can then be used to generate one or more backend collections, or subsets of the curriculum materials, for one or more client users. Before forming the backend collection(s), however, the source 12 can generate one or more records collections.

To generate a records collection, the source 12 can first assemble or otherwise receive a list of one or more pieces of curriculum materials desired by or otherwise of particular interest to one or more client users. For example, for client users comprising students of an anatomy class, the list of curriculum materials may include the textbook, ANATOMY OF THE HUMAN BODY by Henry Gray. Additionally, or alternatively, the list of curriculum materials may include other text, video and/or audio content of particular interest to such students. Irrespective of the piece(s) of curriculum materials listed, for the listed piece(s) of curriculum materials, the source 12 can thereafter add the listed piece(s) of curriculum materials, or at least those listed piece(s) of curriculum materials that are stored in the memory 22 of the source 12 or otherwise obtainable, to a particular record collection. In this regard, once the source 12 determines that a piece of curriculum material is stored in the memory 22 or is otherwise obtainable, the source 12 can retrieve and add that piece of curriculum material to the respective record collection. Once completed, the respective record collection, including all available piece(s) of curriculum materials, can be stored in the memory 22 of the source 12.

As indicated above, after generating one or more records collections, the source 12 can assemble one or more accessible backend collections based upon the generated records collection(s), as shown in block 36. Initially, in instances where the source 12 generates or otherwise stores records collections including curriculum materials desired or otherwise of particular interest to a number of different client users, the source 12 can receive input selecting a particular records collection. Upon receiving the selection of a particular records collection, the source 12 can retrieve, from the memory 22, the selected records collection including the binary representation of at least one piece of curriculum material. Then, the source 12 can proceed to add the binary representation(s) of the piece(s) of curriculum material in the records collection to an accessible backend collection.

After assembling one or more backend collections, the source 12 can provide, or otherwise facilitate providing, the backend collection(s) including the binary representation(s) of the piece(s) of curriculum material, as shown in block 40. In this regard, the backend collection(s) including the binary representation(s) can be provided in any of a number of different manners. For example, one or more backend collections can be stored on a removable electronic storage medium 16 such as a diskette, CD or, more typically, a DVD. The DVD(s) can then be provided to one or more client users, or more particularly, those client users particularly interested in the piece(s) of content materials of the backend collection(s) stored on the respective DVD(s). Alternatively, for example, one or more backend collections can be stored or otherwise maintained by the source 12 or another processor (e.g., server computer) accessible by one or more client users across one or more networks 18. For more information on such a technique for providing content, see PCT Patent Application Publication No. WO 02/17276 A1 entitled: *System and Method for Providing a Curriculum Repository*, filed Aug. 8, 2001, the contents of which are hereby incorporated by reference in its entirety.

As indicated above, as or after the source 12 marks up curriculum materials, the source 12, or more particularly the content manager (i.e., software application 26), can generate a binary representation of the materials. Reference is now made to FIGS. 4A and 4B, which illustrate various steps in a method of representing hierarchically-structured content, in accordance with one embodiment of the present invention. As explained above, the content manager can generate a number of tables including items of the curriculum materials, where each item is represented in a global, identity ID (identifier) table as well as an item type-specific, type table. For example, in accordance with XML, items of content can be characterized by the type of item, such as an element, attribute or character data, with each item of content having an associated ID for the respective table as well as a global, identity ID. As shown in block 42, then, the method of managing hierarchically-structured content can include initializing identity, element, attribute and character data tables. In this regard, the respective tables can be initialized to not include any items, with numbered IDs associated with the items of the respective tables initialized to 1, for example.

Before or after initializing the tables, the content manager (i.e., software application 26) of the source 12 can generate a tree-based representation of the content, such as an XML tree, based upon the items of content, as shown in block 44.

For example, consider the following content hierarchically structured in accordance with XML:

```
<Book>
    <Chapter 1>
        <Section 1 emphasis = "bold">
            content 11
            <Image src = "c:/image11.jpg"/>
        </Section 1>
        <Section 2 emphasis = "bold">
            content 12
        </Section 2>
    </Chapter 1>
    <Chapter 2>
        <Section 1 emphasis = "bold">
            content 21
            <Image src = "c:/image21a.jpg"/>
            <Image src = "c:/image21b.jpg"/>
        </Section 1>
        <Section 2 emphasis = "bold">
            content 22
        </Section 2>
    </Chapter 2>
</Book>
```

From the preceding hierarchically-structured content, the tree-based representation of FIG. 5 can be generated. As illustrated, each node of the tree corresponds to an item of content, whether an element, attribute or character data. Each element item, represented by a circular node, can be associated with one or more hierarchically leading items represented by parent nodes, and/or one or more hierarchically subordinate items represented by children or descendant nodes. In this regard, each attribute or character data item is associated with an element, and thus, is represented by a rectangular or triangular node, respectively, which is a child to an element parent node.

As described herein, a parent can refer to an item that is hierarchically superior to a respective item, or to a node representing such a hierarchically superior item. Likewise, a child or descendant can refer to an item that is hierarchically subordinate to a respective item, or to a node representing such a hierarchically subordinate item. Also, as will be appreciated, a child typically refers to a subordinate item of the first degree, while a descendant typically can refer to a subordinate item of at least the first degree. In this regard, it should be understood that unless otherwise stated, the operations described herein as being performed with respect to a child can typically equally be performed with respect to a descendant.

After initializing the tables and generating the tree-based representation of the content, the content manager (i.e., software application 26) of the source 12 can traverse the tree-based representation of the content, such as in accordance with a pre-order traversal technique, as shown in block 46. By traversing the tree-based representation of the content, then, the content manager can process each item of content in relation to each other item of content in the content hierarchical structure. In this regard, as will be appreciated by those skilled in the art, pre-order traversal of a tree can be defined as processing all nodes of the tree by processing the fundamental item of the tree (i.e., the root), then recursively processing all sub-trees, or descendants of respective parent nodes. For example, the tree-based representation of the content shown in FIG. 5 can be pre-order traversed by processing the nodes in the following order: "Book," "Chapter 1," "Section 1," "emphasis='bold'," "content11," "Image," "src=image11.jpg," "Section 2," "emphasis='bold'," "content12," "Chapter 2," "Section 1,"

"emphasis='bold'," "content21," "Image," "src=image21a.jpg," "Image," "src=image21b.jpg," "Section 2," "emphasis='bold'," and "content22."

As the tree-based representation of the content is pre-order traversed, the content manager (i.e., software application 26) of the source 12 can identify the item of content represented by the first node (e.g., "Book,") along with the item type (e.g., element, attribute or character data), as shown in blocks 48 and 50. The respective item can then be added to the table of the respective item type, and be assigned to the current value of the respective type ID (previously initialized to one), as shown in block 52. For example, for the tree-based representation shown in FIG. 5, the item represented by the first node, i.e., "Book," is an element, and as such, can be added to the element table and assigned the element ID 1. Thereafter, the type ID of the respective table can be incremented by one, such as by incrementing the element type ID from 1 to 2, as shown in block 54.

Also after identifying the item represented by the first node, the content manager (i.e., software application 26) of the source 12 can determine if the item represented by the first node has been added to the identity table, as shown in block 56. In this regard, each item represented by a node can be uniquely added to the identity table and assigned a unique identity ID. In one advantageous embodiment, however, the content manager adds each item to the identity table by assigning a unique identity ID to each unique combination of item type and name (i.e., each unique item type/name pair), referencing the type ID of each item having the respective item type/name. If the content manager determines that the respective item type/name has not been added to the identity table, the item type/name can then be added to the identity table, and be assigned to the current value of the identity ID (previously initialized to 1), as shown in block 58. Otherwise, if the content manager determines that the respective item type/name has been added to the identity table, the item can be assigned the identity ID already associated with the respective item type/name.

For example, for the tree-based representation shown in FIG. 5, the item represented by the first node has the item type/name "element/Book." As the identity table was initialized to not include any items, the content manager (i.e., software application 26) of the source 12 can recognize that the item type/name "element/Book" has not been added to the identity table, and add the respective item type/name to the identity table, assigning the identity ID to the respective item type/name. In addition, the content manager can include, with the identity ID 1, a reference to the type ID previously assigned to the respective item "Book" in the type table (i.e., element ID 1). Then, after assigning the current value of the identity ID to the respective item type/name, the content manager can increment the identity ID of the identity table by one, such as by incrementing the element type ID from 1 to 2, as shown in block 60.

In addition to adding the item of content represented by the first node (e.g., "Book") to a respective type table and assigning a type ID to the respective item, the content manager (i.e., software application 26) of the source 12 can add any one or more other pieces of data to the type table, the pieces of data being associated with the respective item, and thus the respective type ID, as shown in block 62. For example, the element table can include the identity ID and/or name, and/or the parent element ID, associated with the item represented by the first node. But as the item represented by the first node does not have a parent, the parent element ID for that item can be ignored or otherwise set to 0. Also, for example, the element table can identify the children (if any) of the first node. In this regard, the element table can include the identity and type IDs of the children of the item represented by the first node, and/or the element ID of the last descendant of the respective item. As will be appreciated, however, the children of each item, including the item represented by the first node, are typically not added to the identity table or element table until after the respective item is added to the element table. Thus, the identity and type IDs of each child, as well as the element ID of the last descendant, are typically identified for a parent after the respective parent has been added to the element table, and as or after the child/descendant is added to the element table and added to (or referenced in) the identity table.

After the item represented by the first node has been identified, and added or otherwise identified by the type and identity tables, the content manager (i.e., software application 26) of the source 12 can continue to pre-order traverse the tree-based representation of the content by determining if the tree includes more nodes, as shown in block 64. Then, if the tree does include more nodes, the content manager can identify the next node and the node type (e.g., element, attribute or character data), as shown in blocks 66 and 50. The technique can then repeat for each node of the tree, including adding each node to a respective type table and identity table, and assigning respective type and identity IDs to each node. As explained below, however, character data items typically do not have an associated name. As such, within the identity table, the content manager can be capable of assigning a unique identity ID to the items of character data by ignoring the names of the character data items or otherwise considering the items of character data to have names of null values.

The content manager (i.e., software application 26) of the source 12 can also continue to add other piece(s) of data to the type tables (see block 62). As will be appreciated, however, attribute and character data items typically do not have children or subordinate items. As such, the attribute and character data tables typically do not include the identity and type IDs of the children of the respective items, or the element ID of the last descendant of the respective items. Instead, the attribute table typically also includes the values of the respective attribute items, and the character data table typically also includes the text of the respective character data items.

As or after the content manager (i.e., software application 26) of the source 12 pre-order traverses the tree and processes each node, the content manager can be capable of indexing at least one term included within at least one character data item of the content, as shown in block 68. In this regard, as explained below, the client 14 can be capable of searching the binary representation of the content for one or more items of the content. And in one embodiment, the client 14 can query the binary representation based upon the name of an item. As indicated above, however, while elements and attributes can include names, character data does not typically include such a name. And even in those instances where the character data does include a name, the name may not reflect all of the terms included within the character data. As such, the content manager can be capable of indexing term(s) included within character data item(s) to thereafter permit a client 14 to query the content, or more particularly the binary representation of the content, for those term(s).

The content manager (i.e., software application 26) of the source 12 can index the term(s) of the character data item(s) in any of a number of different manners. In one embodiment, for example, the content manager indexes the term(s) by traversing one or more of the character data items included in the character data table. Then, for each term the source 12 or source user desires to index, the content manager can add that term to a character data index and associate that term, in the character data index, with the parent element ID of the character data item including the term. For example, presume that the text "content 11" for the character data having the character data ID 1 includes the term "heart." In such an instance, the content manager can add the term "heart" to the character data index, and associate that term with parent element ID 3 (i.e., "Section 1"). Then, if the text for "content 21" for the character data having the character ID 3 also includes the term "heart," the content manager can associate the parent element ID 7 (i.e., "Section 1") with the already present term in the character data index. The term "heart," then, may appear in the character data index associated with element IDs 3 and 7 (e.g., "heart"—[3, 7]).

After pre-order traversing the tree and processing each node (and indexing the term(s) of character data item(s), if so desired), the content manager has generated a binary representation of the content. The binary representation of the content includes an identity table, as well as a number of type tables (e.g., element, attribute, character data, etc.), each table including a number of different pieces of data relating to each item of content represented by a node of the tree-based representation of the content. In addition, the binary representation can include or otherwise be associated with a character data table for term(s) of character data item(s) of the content. As an example, the tables of the binary representation of the example structured content shown above and in the tree-based representation of FIG. 5 can be written as follows:

Identity Table

| Identity ID: | Type ID(s): | Type: | Name: |
|---|---|---|---|
| 1 | 1 | element | Book |
| 2 | 2 | element | Chapter 1 |
| 3 | 3, 7 | element | Section 1 |
| 4 | 1, 3, 4, 7 | attribute | Emphasis |
| 5 | 1, 2, 3, 4 | character data | |
| 6 | 4, 8, 9 | element | Image |
| 7 | 2, 5, 6 | attribute | Src |
| 8 | 5, 10 | element | Section 2 |
| 9 | 6 | element | Chapter 2 |

Element Table

| Element ID: | Identity ID (name): | Parent Element ID: | Children (Identity ID, Type ID): | Last Descendant Element ID |
|---|---|---|---|---|
| 1 | 1 (Book) | 0 | (2, 2) (9, 6) | 10 |
| 2 | 2 (Chapter 1) | 1 | (3, 3) (8, 5) | 5 |
| 3 | 3 (Section 1) | 2 | (4, 0) (5, 0) (6, 4) | 4 |
| 4 | 6 (Image) | 3 | (7, 1) | 4 |
| 5 | 8 (Section 2) | 2 | (4, 2) (5, 1) | 5 |
| 6 | 9 (Chapter 2) | 1 | (3, 7) (8, 10) | 10 |
| 7 | 3 (Section 1) | 6 | (4, 3) (5, 2) (6, 8) (6, 9) | 9 |
| 8 | 6 (Image) | 7 | (7, 4) | 8 |
| 9 | 6 (Image) | 7 | (7, 5) | 9 |
| 10 | 8 (Section 2) | 6 | (4, 6) (5, 3) | 10 |

Attribute Table

| Attribute ID: | Identity ID (name): | Parent Element ID: | Value: |
|---|---|---|---|
| 1 | 4 (emphasis) | 3 | bold |
| 2 | 7 (src) | 4 | c:/image11.jpg |
| 3 | 4 (emphasis) | 5 | bold |
| 4 | 4 (emphasis) | 7 | bold |
| 5 | 7 (src) | 8 | c:/image21a.jpg |
| 6 | 7 (src) | 9 | c:/image21b.jpg |
| 7 | 4 (emphasis) | 10 | bold |

Character Data Table

| Character Data ID: | Identity ID: | Parent Element ID: | Text: |
|---|---|---|---|
| 1 | 5 | 3 | content 11 |
| 2 | 5 | 5 | content 12 |
| 3 | 5 | 7 | content 21 |
| 4 | 5 | 10 | content 22 |

Irrespective of how the source 12 provides the content, then, the content can be provided as a binary representation, from which the access application (i.e., software application 26) of a client 14 can access at least a portion of the content. In this regard, FIG. 6 illustrates various steps in a method of accessing content in accordance with one embodiment of the present invention. As shown in block 70, the method includes the access application of a client 14 receiving the binary representation of content, including the identity table and item type tables. As explained above, the binary representation can be received in any of a number of different manners, such as by accessing the binary representation of the content across one or more networks 18 (e.g., the Internet), and/or from a DVD storing the binary representation of the content. Irrespective of how the source 12 receives the binary representation of the content, the access application can thereafter access at least a portion of the content by first recreating the tree-based representation of the respective portion of the content, such as in temporary memory (e.g., volatile memory) of the client 14, as shown in block 72.

The access application (i.e., software application 26) of the client 14 can recreate the tree-based representation of the respective portion of the content in any of a number of different manners. In this regard, reference is now made to FIGS. 7A, 7B and 7C, which illustrate various steps in a method of recreating a tree-based representation of content from a binary representation of the same. As shown in block 74, the access application can begin by reading, downloading or otherwise receiving the identity table of the respective binary representation. For example, the access application can read the identity table from a memory storing the binary representation of the content (e.g., DVD). Recreating the tree-based representation for the all of the content, then, the access application can select the item associated with the first identity ID and type ID, that is item (1, 1), as shown in block 76. Thereafter, the access application can generate a node of a tree-based representation of the content, the node being for item (1, 1), as shown in block 78. In this regard, the access application can read the node type and name from the identity table, the node type and name being associated with item (1, 1). Then, the access application can generate a node for the node type and including the name.

After generating the node, the access application (i.e., software application 26) of the client 14 can read, download or otherwise receive the element table (e.g., element table) of the binary representation of the content, as illustrated by block 80. Then, as shown in blocks 82 and 84, the access application can identify, from the type table, any descendants for the item represented by the generated node, the descendants being those associated with item (1, 1). If item (1, 1) does not have at least one descendant, typically requiring at least one child, the access application has completed the tree-based representation of the content. Otherwise, the access application can pre-order traverse the descendants of item (1, 1), as shown in block 86 to continue recreating the tree-based representation of the content.

For each descendent (i.e., child of either a parent descendent of item (1, 1), or item (1, 1) itself), processed during the pre-order traversal, the access application (i.e., software application 26) of the client 14 can identify the identity ID, type ID (n, m) of the descendant, as shown in block 88. Then, the access application can generate a node of the tree-based representation of the content based upon the identity ID n, as shown in block 90. Similar to before, the access application can read the node type and name from the identity table, the node type and name being associated with item (n, m). Then, the access application can generate a node for the node type and including the name.

As or after the access application (i.e., software application 26) of the client 14 generates the node for the descendant, the access application can determine if the descendant is an attribute or character data item of content, such as by reading the node type from the identity table, as shown in block 92. If the descendant is an attribute or character data, the access application can read, download or otherwise receive the value of the attribute or text of the character data from the attribute or character data table, respectively, as shown in block 94. For example, the access application can perform a table lookup for the respective table based upon the identity ID m, reading the value/text associated with descendant (n, m). Then, after the access application has received the value/text, the access application can add the respective value/text to the node generated for the descendant.

After adding the value/text to the node, or if the descendant is not an attribute or character data (i.e., if the descendant is an element), the access application can link or otherwise associate the descendant node to its parent, as shown in block 96. The access application (i.e., software application 26) of the client 14 can then continue to pre-order traverse the descendants of item (1, 1) by determining if item (1, 1) includes more descendants, as shown in block 98. If item (1, 1) does include more descendants, the access application can identify the identity ID, type ID of the next descendant, as again shown in block 88. The technique can then repeat for each descendant of item (1, 1), including generating a node for each descendant, adding the value/text for each attribute/character data item, and linking the node to a respective parent. Then, after pre-order traversing the descendants of item (1, 1), the access application has recreated the tree-based representation of the content from the binary representation of the same.

As indicated above, the access application (i.e., software application 26) of the client 14 can recreate the tree-based representation for the all of the content by selecting, from the identity table, the item associated with the first identity ID and type ID (i.e., item (1, 1)). It should be understood, however, that the access application can equally recreate the tree-based representation for only a portion of the content. In such instances, for example, the access application can select, from the identity table, the first item associated with the portion of the content being recreated. For example, if it is desired to only recreate, and thus access, the portion of the content described above beginning with the element item "Chapter 2," the access application can select item (9, 6) from the identity table. Thereafter, the access application can proceed, as before, recreating the tree-based representation of the content for the item "Chapter 2," and the descendants of the respective item.

Also, although the access application can recreate the tree-based representation of all of the descendants of a parent, the access application can proceed by only generating a node for the parent without pre-order traversing the descendants of the respective parent. Alternatively, the access application can be configured to pre-order traverse only a portion of the descendants of a parent. For example, the access application can be configured to pre-order traverse only those attribute and/or character data descendants of a parent, without processing element descendants of the respective parent.

Again referring to FIG. 6, after recreating the tree-based representation of the content, the access application (i.e., software application 26) of the client 14 can generate content from the recreated tree-based representation of the content, such as in temporary memory (e.g., volatile memory) of the client 14, as shown in block 100. The access application can generate the content in any of a number of different manners, such as in a manner opposite that employed by the content manager of the source 12 in generating the binary representation of the same content. Thereafter, access application can access the generated content, as shown in block 102. For example, the access application can render the generated content for display to the client user.

As will be appreciated, in various instances it may be desirable to query the content for one or more items such that those items can thereafter be accessed. For example, it may be desirable to query the content for one or more graphics of the content. In such instances, the access application (i.e., software application 26) of the client 14 can be capable of searching the binary representation of the content in a manner that does not require the access application to inefficiently access the content from memory in a hierarchical manner from top down, and traverse the accessed content until the select item(s) are located. Reference, then, is drawn to FIG. 8, which illustrates various steps in a method of searching a representation of content for one or more items of the content, such as to thereafter access the query results, in accordance with one embodiment of the present invention. As shown in block 104, the method of this aspect of the present invention includes the access application of a client 14 receiving the binary representation of content including the identity table and item type tables, such as in the same manner explained above (see block 70 of FIG. 6). Irrespective of how the source 12 receives the binary representation of the content, the access application can thereafter receive a query of a client user, the query identifying one or more items of content, as shown in block 106. For example, the access application can receive a query including the name (e.g., "Chapter 1") of one or more element or attribute items, or a term of one or more character data items.

After receiving the query, the access application (i.e., software application 26) of the client 14 can search the binary representation of the content for one or more items of content based upon the query, as shown in block 108. Then, the access application can recreate the tree-based representation of at least a portion of the content representing the results of the search (e.g., in temporary memory of the client 14), as shown in block 110. In this regard, the access application can search the binary representation, and recreate the tree-based representation based upon the query result, in any of a number of different manners. Referring to FIGS. 9A, 9B, 9C and 9D, in one embodiment for example, a method of searching a binary representation of content, and accessing at least a portion of the content based upon a query result, includes the access application determining if the query comprises an element/attribute name or a term of character data, as shown in block 112.

If the query comprises an element/attribute name, the access application can continue by reading, downloading or otherwise receiving the identity table of the respective binary representation, such as in the manner explained above, as shown in block 114. After receiving the identity table, the access application (i.e., software application 26) of the client 14 can determine if content includes the desired item(s) of content identified in the client user's query. More particularly, for example, the access application can determine if the identity table includes at least one item of content matching the name of the desired item(s) of content included in the query, as shown in block 116. Then, if the identity table does not include an item matching the name of the desired item(s), the access application, recognizing that the content does not include the desired item(s) of content, can terminate the query and re-creation of the binary-representation of the content. In addition, if so desired, the access application can notify the client user that the content does not include the desired item(s) of content.

If the identity table does include at least one item matching the name of the desired item(s), the access application (i.e., software application 26) of the client 14 can conclude that the content includes the desired item(s) of content. Then, the access application can select, from the identity table, the identity ID associated with the name of the matching item(s), as shown in block 118. As will be appreciated, because character data typically does not include an item name, the item(s) matching the name of the desired item(s) typically comprise elements or attributes. As such, the selected identity ID is typically associated with one or more elements or attributes.

After selecting the identity ID, the access application (i.e., software application 26) of the client 14 can determine if the identity ID is associated with one or more element items, as shown in block 120. If the identity ID is associated with element item(s), the access application can read, download or otherwise receive the element table of the respective binary representation, as shown in block 122. Also, before, as or after receiving the element table, the access application can select an element ID associated with the selected identity ID, as shown in block 124. Then, the access application can generate a node of a tree-based representation of the content, the node being for the item having the selected element and identity IDs, as shown in block 126. As before, the access application can generate the node by reading the node type (i.e., element) and name from the identity table, and generating a node for the node type and including the name.

After generating the node for the item having the selected element and identity IDs, the access application (i.e., software application 26) of the client 14 can identify, from the element table, any descendants for the item represented by the generated node, the descendants being those associated with the item having the selected element and identity IDs, as explained above and shown in blocks 82 and 84 of FIG. 7B. If the respective item has at least one descendant, the access application can pre-order traverse the descendants of the respective item to thereby generate nodes of the tree-based representation of the content for the descendants. In this regard, the access application can pre-order traverse the descendants and generate the nodes in any of a number of different manners, such as in the same manner described above and shown in blocks 86-98 of FIGS. 7B and 7C.

After pre-order traversing the descendants of the item having the selected element and identity IDs, or if the respective item does not have at least one descendant, the access application (i.e., software application 26) of the client 14 can determine, from the identity ID, if the selected identity ID has any other associated element IDs, as shown in block 128. For one or more of the element IDs associated with the selected identity ID, then, the access application can select the element ID, and generate a node of the tree-based representation for the item having the selected element and identity IDs, as explained above. Also for one or more of the element IDs associated with the selected identity ID, the access application can identify any descendants for the item represented by the generated node, and pre-order traverse any such descendants to thereby generate nodes of the tree-based representation of the content for those descendants, as also explained above.

If the identity ID is associated with one or more attribute items instead of element item(s), the access application (i.e., software application 26) of the client 14 can process the attribute item(s) in the same manner as explained above with respect to the element item(s). In one particularly advantageous embodiment, however, the access application instead identifies the parent element(s) of the respective attribute item(s), and processes those parent element(s). More particularly, as shown in block 130 of FIG. 9C, the access application can read, download or otherwise receive the attribute table of the respective binary representation, if the identity ID is associated with attribute item(s). Before, as or after the access application receives the attribute table, the access application can select an attribute ID associated with the selected identity ID, as shown in block 132. Thereafter, as illustrated by block 134, the access application can identify, from the attribute table, the element ID of the parent of the respective attribute. Then, the access application can read, download or otherwise receive the element table of the respective binary representation and, after locating the element ID of the parent, determine the identity ID of the parent, as shown in block 136.

After determining the identity ID of the parent element of the selected attribute ID, the access application (i.e., software application 26) of the client 14 can generate a node of the tree-based representation for the parent element based upon the respective identity ID, as shown in block 138. As before, the access application can generate the node by reading the node type (i.e., element) and name from the identity table, and generating a node for the node type and including the name.

After generating the node for the element parent, the access application (i.e., software application 26) of the client 14 can identify, from the element table, any descendants for the parent element represented by the generated node, the descendants being those associated with the parent element, again as explained above and shown blocks 82 and 84 of FIG. 7B. As will be appreciated, in this instance, the parent element will typically have at least one descendant, the attribute item associated with the selected attribute ID. Thus, the access application can pre-order traverse the descendants of the respective item to thereby generate nodes of the tree-based representation of the content for the descendants. As explained before, the access application can pre-order traverse the descendants and generate the nodes in any of a number of different manners, such as in the same manner described above and shown in blocks 86-98 of FIGS. 7B and 7C.

After pre-order traversing the descendants of the parent element, the access application (i.e., software application 26) of the client 14 can determine, from the previously selected identity ID associated with one or more attribute items, if the selected identity ID has any other associated attribute IDs, as shown in block 140. For one or more of the attribute IDs associated with the selected identity ID, then, the access application can select the attribute ID, determine the parent element of the respective attribute, and generate a node of the tree-based representation for the parent element, as explained above. Also for one or more of the parent element IDs of the attribute IDs associated with the selected identity ID, the access application can identify the descendants for the parent elements (including the respective attributes) represented by the generated node, and pre-order traverse those descendants to thereby generate nodes of the tree-based representation of the content for those descendants, again as explained above.

Figures 9A, 9B:
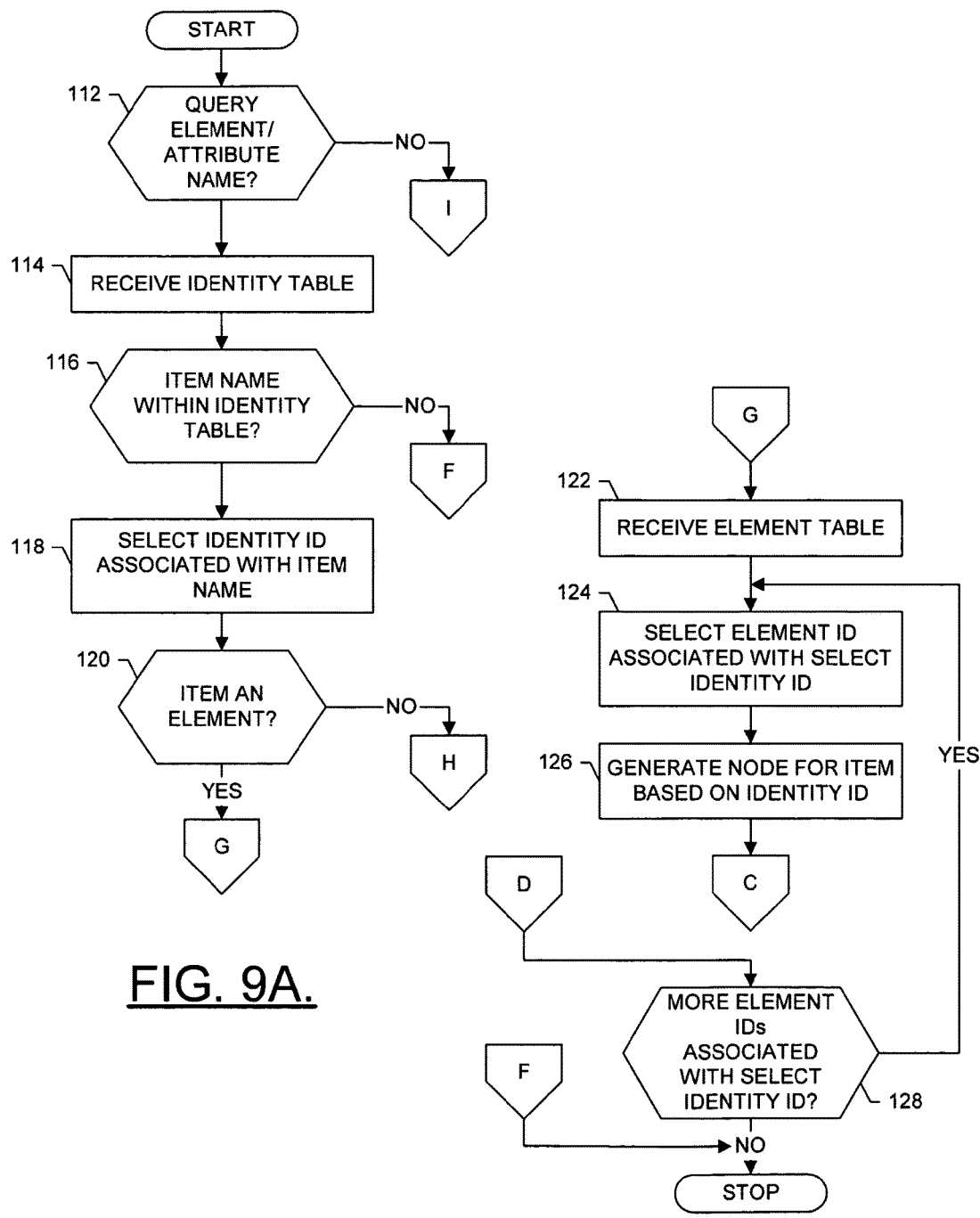
Figure 9C:
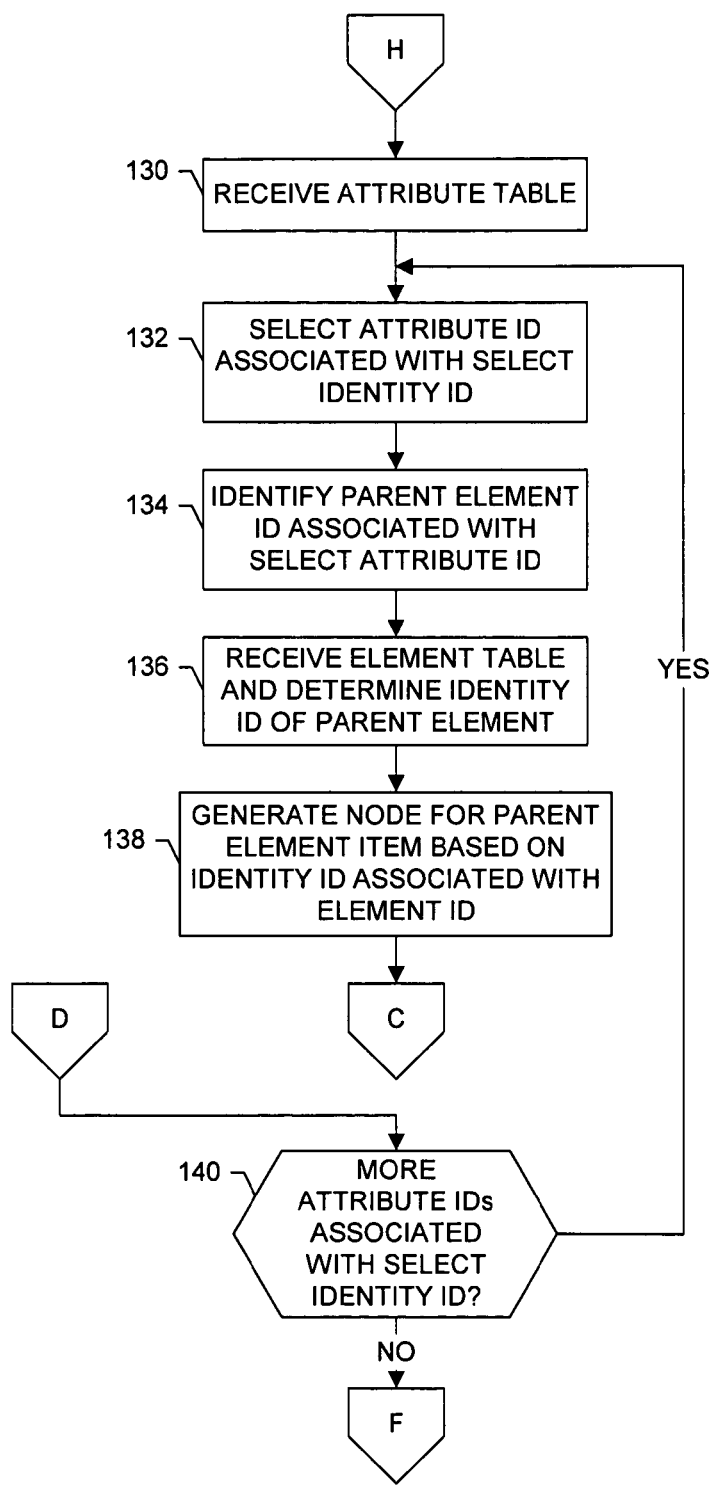
Figure 9D:
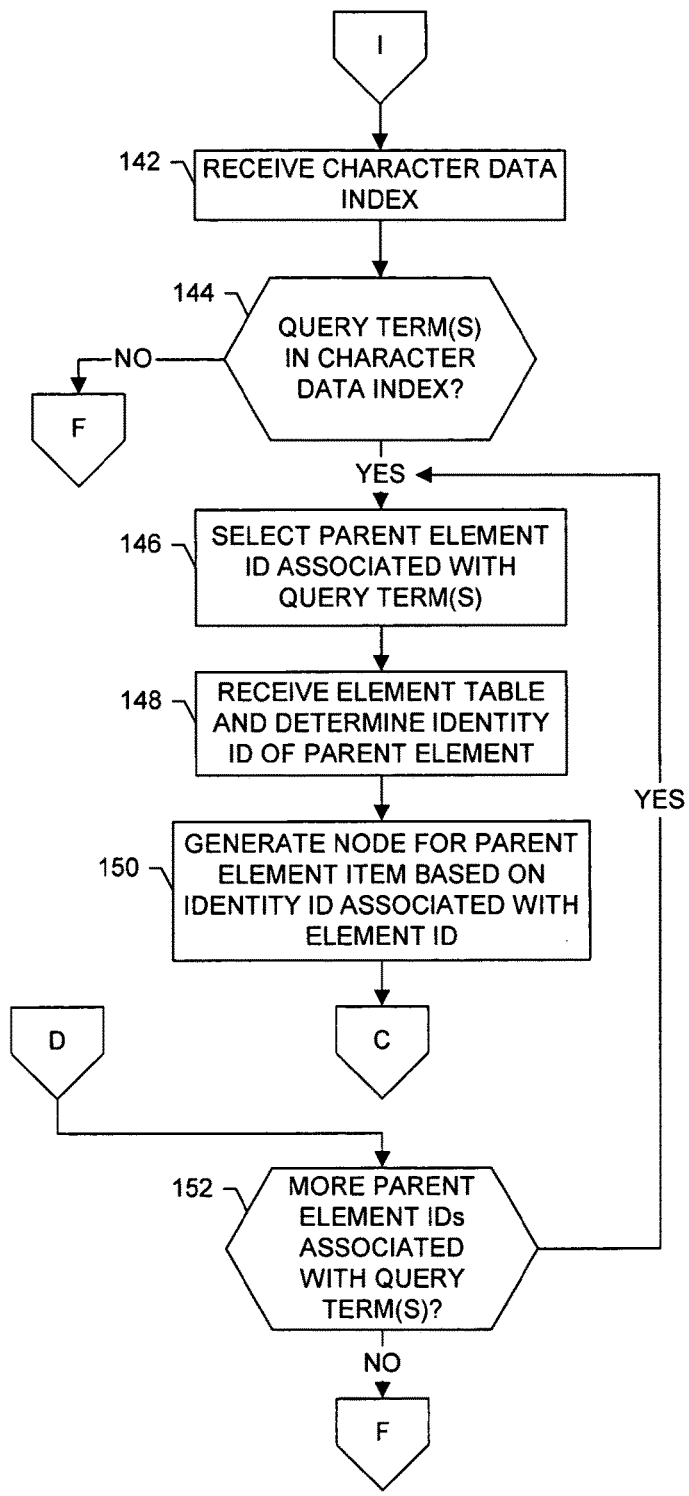

Referring to FIG. 9D, if instead of an element/attribute name, the query includes a term of character data, the access application (i.e., software application 26) of the client 14 can read, download or otherwise receive the character data index of the respective binary representation, as shown in block 142. After receiving the character data index, the access application can determine if the character data index includes the query term, as illustrated by block 144. If the character data index does not include a term matching the query term, the access application can terminate the query and re-creation of the binary-representation of the content. In addition, as before, the access application can notify the client user that the content does not include the desired item(s) of content, if so desired.

If the character data index does include the query term, the access application (i.e., software application 26) of the client 14 can select, from the character data index, an element ID of a parent element associated with the query term, as shown in block 146. Thereafter, the access application can read, download or otherwise receive the element table of the respective binary representation, locate the element ID of the parent, and determine the identity ID of the parent, as shown in block 148. After determining the identity ID of the selected parent element, the access application can generate a node of the tree-based representation for the parent element based upon the respective identity ID, as shown in block 150, such as in the same manner explained above.

After generating the node for the element parent, the access application (i.e., software application 26) of the client 14 can identify, from the element table, any descendants for the parent element represented by the generated node, the descendants being those associated with the parent element, again as explained above and shown blocks 82 and 84 of FIG. 7B. As will be appreciated, in this instance, the parent element will typically have at least one descendant, the character data including the term associated with the selected parent element ID. Thus, the access application can pre-order traverse the descendants of the respective item to thereby generate nodes of the tree-based representation of the content for the descendants. As explained before, the access application can pre-order traverse the descendants and generate the nodes in any of a number of different manners, such as in the same manner described above and shown in blocks 86-98 of FIGS. 7B and 7C.

After pre-order traversing the descendants of the parent element, the access application (i.e., software application 26) of the client 14 can determine, again from the query term found in the character data index, if the query term has any other associated parent element IDs, as shown in block 152. For one or more of the parent element IDs associated with the query term in the character data index, then, the access application can select the parent element ID, and generate a node of the tree-based representation for the parent element, as explained above. Also for one or more of the respective parent element IDs, the access application can identify the descendants for the parent elements (including the character data including the respective query term) represented by the generated node, and pre-order traverse those descendants to thereby generate nodes of the tree-based representation of the content for those descendants, again as explained above.

Although the preceding explained searching the content for a term included in one or more character data items of the content, it should be appreciated that the access application (i.e., software application 26) of the client 14 can be configured to query for more than one term, such as for character data items including all of two or more terms. In such instances, the access application can search the character data index to select parent element IDs that are associated with all of the query terms, and thereafter process those parent element IDs as before. Alternatively, for example, the access application can be configured to query for character data items including at least one of two or more terms. In those instances, the access application can be configured to select parent element IDs that are associated with any one or more of the query terms, and process those parent element IDs as before.

As explained above, the access application (i.e., software application 26) of the client 14 can recreate the tree-based representation of one or more elements (including parent elements of attributes and/or character data) or one or more attributes associated with a respective identity ID. It should be understood, however, that the access application can be configured to recreate the tree-based representation for only a select number of the elements or attributes associated with a respective identity ID. In this regard, the access application can be configured to recreate, and thus subsequently access, content for only a select one or more of the elements or attributes found in searching the content. For example, the access application can be configured to recreate, and thus access, only "Section 1" of "Chapter 1" of the "Book," and not also access "Section 1" of "Chapter 2." Also, for example, the access application can be configured to recreate, and thus access, only the character data of "Chapter 2" of the "Book."

As also explained above, when the selected identity ID is associated with an attribute, or when the query comprises a term of character data, the access application (i.e., software application 26) of the client 14 can identify, from the attribute table or character data index, respectively, the element ID of the parent of the respective attribute or character data including the respective term. The access application can then recreate the tree-based representation of that parent and its descendants, including the respective attribute or character data including the respective term. It should be understood, then, that the access application can be configured to identify, from the element ID table, a higher degree ascendant of the attribute or character data, and recreate the tree-based representation of that higher degree ascendant and its descendants, including the parent of the attribute or character data and the attribute or character data itself. Similarly, when the selected identity ID is associated with an element, the access application can be configured to identify, from the element ID table, a parent or higher degree ascendant of the element, and recreate the tree-based representation of that parent or higher degree ascendant and its descendants, including the element itself.

Again referring to FIG. 8, irrespective of how the access application (i.e., software application 26) of the client 14 recreates the tree-based representation of at least a portion of the content, the access application can thereafter generate at least a portion of the content from the recreated tree-based representation of the same, such as in temporary memory (e.g., volatile memory) of the client 14, as shown in block 154, such as in the same manner as indicated above. The access application can then access the generated content, as shown in block 156, such as by rendering the generated content for display to the client user.

As described above, the content manager of the source 12 and the access application of the client 14 are capable of processing items of content by pre-order traversing hierarchically-structured content, and in various instances, identifying the descendants of one or more items. It should be understood, however, that the content manager and/or access application can perform the same functions in any of a number of different manners without departing from the spirit and scope of the present invention. For example, in lieu of pre-order traversing the content and identifying the descendants of one or more items, the content manager and/or access application can in-order traverse the content and identify one or more ascendants of one or more items.

According to one aspect of the present invention, all or a portion of the system 10 of the present invention, such as all or portions of the source 12 and/or client 14 generally operates under control of a computer program product (e.g., content manager, access application, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 3, 4A, 4B, 6, 7A, 7B, 7C, 8, 9A, 9B, 9C and 9D are flowcharts of methods, systems and program products according to embodiments of the present invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of block(s) or step(s) in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A client for accessing content comprising:
a processor configured to operate an access application, the access application configured to receive a representation of the content, wherein the content is hierarchically-structured and includes at least first and second items having first and second associated types, respectively, and wherein the representation of the content comprises an identity table and at least first and second type tables, the first type table including at least one item of the first associated type and the second type table including at least one item of the second associated type, each item of content being included in the identity table, and included in at least the first and second type tables based upon the type of the item, the identity table including, for at least one item of content, (i) an item type, (ii) a type identification, (iii) a type name, and (iv) an identity identification associated with a unique combination of: (a) the associated type identification of the item and (b) the type name, the identity identification comprising a plurality of identifiers associated with the type name of the at least one item of content, wherein the access application is configured to access at least a portion of the content based upon the representation of the content including at least the identity table and the first and second type tables.

2. The client according to claim 1, wherein the access application is configured to access at least a portion of the content by recreating a tree-based representation of at least a portion of the content based upon the identity table and at least the first and second type tables, and generating at least a portion of the content from the recreated tree-based representation.

3. The client according to claim 2, wherein the access application is configured to recreate the tree-based representation of at least a portion of the content by generating at least one node of the tree-based representation, each node representing an item of the respective portion of the content.

4. The client according to claim 3, wherein the access application is configured to generate a node of the tree-based representation by selecting, from the identity table, an item within the respective portion of the content, generating a node of the tree-based representation for the selected item, and traversing at least one descendant item of the selected item when the selected item has at least one descendant item, and wherein traversal of the at least one descendant item includes generating a node representing each of at least one descendant item, and associating the node with a respective parent item.

5. The client according to claim 3, wherein the at least one item of content has an associated type comprising one of an element, attribute, and character data, and wherein the access application is configured to recreate the tree-based representation of at least a portion of the content by generating at least one node representing at least one of an element item, an attribute item, and a character data item of the respective portion of the content.

6. The client according to claim 5, wherein at least one attribute item has a value, and at least one character data item has a text, and wherein the access application is configured to recreate the tree-based representation of at least a portion of the content by also adding a value to a node of the tree-based representation when the respective node represents an attribute item, and adding a text to a node of the tree-based representation when the respective node represents a character data item.

7. The client according to claim 1, wherein the access application is further configured to receive a query identifying at least one item of the content, and search the representation of the content for the at least one item identified by the query, and wherein the access application is configured to access at least a portion of the content based upon the search, the accessed portion of the content including the at least one item identified by the query.

8. The client according to claim 7, wherein the access application is configured to access at least a portion of the content by recreating a tree-based representation of at least a portion of the content including the at least one item of content identified by the query, and generate at least a portion of the content from the recreated tree-based representation to thereby access the generated portion of the content.

9. The client according to claim 7, wherein the at least one item has an associated type comprising one of an element, attribute, and character data, and wherein the access application is configured to receive a query including one of a name of at least one element item, and a name of at least one attribute item.

10. The client according to claim 9, wherein the identity table of the representation of the content includes, for at least one of an element item and an attribute item, a name associated with the respective item, and wherein the access application is configured to search the representation of the content by searching the identity table for a name matching a name included in the query.

11. The client according to claim 7, wherein the at least one item has an associated type comprising one of an element, attribute, and character data, and wherein the access application is configured to receive a query including at least one term included in at least one character data item.

12. The client according to claim 11, wherein the representation of the content further includes a character data index including at least one term of at least one character data item, and wherein the access application is configured to search the representation of the content by searching the character data index for at least one term matching at least one term included in the query.

13. The client of claim 1, wherein the identity table further includes, for the at least one item of content, a type identification corresponding to the first or second type table.

14. A method of accessing content comprising:
providing a representation of the content, wherein the content is hierarchically-structured and includes at least first and second items having first and second associated types, respectively, and wherein the representation of the content comprises an identity table and at least first and second type tables, the first type table including at least one item of the first associated type and the second type table including at least one item of the second associated type, each item of content being included in the identity table, and included in at least the first and second type tables based upon the type of the item, the identity table including, for at least one item of content, (i) an item type, (ii) a type identification, (iii) a type name, and (iv) an identity identification associated with a unique combination of: (a) the associated type identification of the item and (b) the type name, the identity identification comprising a plurality of identifiers associated with the type name of the at least one item of content; and
accessing with a processor at least a portion of the content based upon the representation of the content including the identity table and at least one type table.

15. The method according to claim 14, wherein accessing with a processor at least a portion of the content comprises:
recreating a tree-based representation of at least a portion of the content based upon the identity table and at least the first and second type tables; and
generating at least a portion of the content from the recreated tree-based representation to thereby access the generated potion of the content.

16. The method according to claim 15, wherein recreating a tree-based representation of at least a portion of the content comprises generating at least one node of the tree-based representation, each node representing an item of the respective portion of the content.

17. The method according to claim 16, wherein generating a node of the tree-based representation comprises:
selecting, from the identity table, an item within the respective portion of the content;
generating a node of the tree-based representation for the selected item; and
traversing at least one descendant item of the selected item when the selected item has at least one descendant item, wherein traversing at least one descendant item includes generating a node representing each of at least one descendant item, and associating the node with a respective parent item.

18. The method according to claim 16, wherein the at least one item of content has an associated type comprising one of an element, attribute, and character data, and wherein recreating a tree-based representation of at least a portion of the content comprises generating at least one node representing at least one of an element item, an attribute item, and a character data item of the respective portion of the content.

19. The method according to claim 18, wherein at least one attribute item has a value, and at least one character data item has a text, and wherein recreating a tree-based representation of at least a portion of the content further comprises:
adding a value to a node of the tree-based representation when the respective node represents an attribute item; and
adding a text to a node of the tree-based representation when the respective node represents a character data item.

20. The method according to claim 14 further comprising:
receiving a query identifying at least one item of the content; and
searching the representation of the content for the at least one item identified by the query,
wherein accessing with a processor at least a portion of the content comprises accessing at least a portion of the content based upon the search, the accessed portion of the content including the at least one item identified by the query.

21. The method according to claim 20, wherein accessing with a processor at least a portion of the content comprises:
recreating a tree-based representation of at least a portion of the content including the at least one item of content identified by the query; and
generating at least a portion of the content from the recreated tree-based representation to thereby access the generated portion of the content.

22. The method according to claim 20, wherein the at least one item has an associated type comprising one of an element, attribute, and character data, and wherein receiving a query comprises receiving a query including one of a name of at least one element item, and a name of at least one attribute item.

23. The method according to claim 22, wherein the identity table of the representation of the content includes, for at least one of an element item and an attribute item, a name associated with the respective item, and wherein searching the representation of the content comprises searching the identity table for a name matching a name included in the query.

24. The method according to claim 20, wherein the at least one item has an associated type comprising one of an element, attribute, and character data, and wherein receiving a query comprises receiving a query including at least one term included in at least one character data item.

25. The method according to claim 24, wherein the representation of the content further includes a character data index including at least one term of at least one character data item, and wherein searching the representation of the content comprises searching the character data index for at least one term matching at least one term included in the query.

26. A computer program product for accessing content, the computer program product comprising at least one computer-readable storage medium having computer-readable program code portions stored therein, the computer-readable program code portions comprising:
a first executable portion configured to receive a representation of the content, wherein the content is hierarchically-structured and includes at least first and second items having first and second associated types, respectively, and wherein the representation of the content comprises an identity table first and second type tables, the first type table including at least one item of the first associated type and the second type table including at least one item of the second associated type, each item of content being included in the identity table, and included in at least the first and second type tables based upon the type of the item, the identity table including, for at least one item of content, (i) an item type, (ii) a type identification, (iii) a type name, and (iv) an identity identification associated with a unique combination of: (a) the associated type identification of the item and (b) the type name the identity identification comprising a plurality of identifiers associated with the type name of the at least one item of content; and
a second executable portion configured to access at least a portion of the content based upon the representation of the content including the identity table and at least the first and second type tables.

27. The computer program product according to claim 26, wherein the second executable portion is configured to access at least a portion of the content by recreating a tree-based representation of at least a portion of the content based upon the identity table and at least the first and second type tables, and generating at least a portion of the content from the recreated tree-based representation to thereby access the generated potion of the content.

28. The computer program product according to claim 27, wherein the second executable portion is configured to recreate the tree-based representation of at least a portion of the content by generating at least one node of the tree-based representation, each node representing an item of the respective portion of the content.

29. The computer program product according to claim 28, wherein the second executable portion is configured to generate a node of the tree-based representation by selecting, from the identity table, an item within the respective portion of the content, generating a node of the tree-based representation for the selected item, and traversing at least one descendant item of the selected item when the selected item has at least one descendant item, and wherein traversal of the at least one descendant item includes generating a node representing each of at least one descendant item, and associating the node with a respective parent item.

30. The computer program product according to claim 28, wherein the at least one item of content has an associated type comprising one of an element, attribute, and character data, and wherein the second executable portion is configured to recreate the tree-based representation of at least a portion of the content by generating at least one node representing at least one of an element item, an attribute item, and a character data item of the respective portion of the content.

31. The computer program product according to claim 30, wherein at least one attribute item has a value, and at least one character data item has a text, and wherein the second executable portion is configured to recreate the tree-based representation of at least a portion of the content by also adding a value to a node of the tree-based representation when the respective node represents an attribute item, and adding a text to a node of the tree-based representation when the respective node represents a character data item.

32. The computer program product according to claim 26 further comprising:
a third executable portion for receiving a query identifying at least one item of the content; and
a fourth executable portion for searching the representation of the content for the at least one item identified by the query;
wherein the second executable portion is configured to access at least a portion of the content based upon the search, the accessed portion of the content including the at least one item identified by the query.

33. The computer program product according to claim 32, wherein the second executable portion is configured to access at least a portion of the content by recreating a tree-based representation of at least a portion of the content including the at least one item of content identified by the query, and generating at least a portion of the content from the recreated tree-based representation to thereby access the generated portion of the content.

34. The computer program product according to claim 32, wherein the at least one item has an associated type comprising one of an element, attribute, and character data, and wherein the third executable portion is configured to receive a query including one of a name of at least one element item, and a name of at least one attribute item.

35. The computer program product according to claim 34, wherein the identity table of the representation of the content includes, for at least one of an element item and an attribute item, a name associated with the respective item, and wherein the fourth executable portion is configured to search the identity table for a name matching a name included in the query.

36. The computer program product according to claim 32, wherein the at least one item has an associated type comprising one of an element, attribute, and character data, and wherein the third executable portion is configured to receive a query including at least one term included in at least one character data item.

37. The computer program product according to claim 36, wherein the representation of the content further includes a character data index including at least one term of at least one character data item, and wherein the fourth executable portion is configured to search the character data index for at least one term matching at least one term included in the query.

* * * * *